(12) United States Patent
Verny et al.

(10) Patent No.: US 10,940,948 B2
(45) Date of Patent: Mar. 9, 2021

(54) AIRCRAFT SEAT FOR CABIN CREW

(71) Applicant: Safran Seats, Plaisir (FR)

(72) Inventors: Christian Verny, Issoudun (FR); Brice Lebegue, Issoudun (FR); Alexandre Mesaros, Issoudun (FR)

(73) Assignee: Safran Seats, Plaisir (FR)

( * ) Notice: Subject to any disclaimer, the term of this patent is extended or adjusted under 35 U.S.C. 154(b) by 310 days.

(21) Appl. No.: 15/774,374

(22) PCT Filed: Nov. 7, 2016

(86) PCT No.: PCT/EP2016/076779
§ 371 (c)(1),
(2) Date: May 8, 2018

(87) PCT Pub. No.: WO2017/080939
PCT Pub. Date: May 18, 2017

(65) Prior Publication Data
US 2020/0262561 A1    Aug. 20, 2020

(30) Foreign Application Priority Data

Nov. 10, 2015  (EP) ..................................... 15193929

(51) Int. Cl.
*B64D 11/06*           (2006.01)
(52) U.S. Cl.
CPC ........ *B64D 11/064* (2014.12); *B64D 11/0641* (2014.12); *B64D 11/0642* (2014.12); *B64D 11/0643* (2014.12); *B64D 11/0691* (2014.12)
(58) Field of Classification Search
None
See application file for complete search history.

(56) References Cited

U.S. PATENT DOCUMENTS

| 4,534,594 A | * | 8/1985 | Lucien | ................... | A47C 16/02 |
| | | | | | 297/423.4 |
| 4,635,999 A | * | 1/1987 | Simpson | ................ | B64D 11/06 |
| | | | | | 297/88 |

(Continued)

FOREIGN PATENT DOCUMENTS

| DE | 3634839 | | 4/1988 | | |
| DE | 102012108351 A1 | * | 3/2014 | ............... | B60N 2/34 |

(Continued)

OTHER PUBLICATIONS

International Patent Application No. PCT/EP2016/076779, International Search Report and Written Opinion, dated Dec. 22, 2016.

(Continued)

*Primary Examiner* — David E Allred
(74) *Attorney, Agent, or Firm* — Kilpatrick Townsend & Stockton LLP

(57) ABSTRACT

A seat for cabin crew, intended to be installed in an aircraft, includes a seat structure intended to be fixed to a fixed portion of the aircraft, a seat slide provided with two arms positioned on either side of the seat portion, and a seat portion mounted slidably relative to the seat slide between a retracted position and an extended position. One of the elements among the seat portion and the seat slide includes rollers capable of sliding along corresponding rails provided in the other one of the elements among the seat portion and the seat slide. The rails have a curved shape so that the seat portion forms, in the extended position, an angle of more than 10 degrees, preferably of around 14 degrees, relative to a floor of the aircraft.

18 Claims, 6 Drawing Sheets

(56) References Cited

U.S. PATENT DOCUMENTS

| | | | |
|---|---|---|---|
| 4,799,632 A | | 1/1989 | Baymak et al. |
| 4,902,069 A | * | 2/1990 | Lehnert .............. B64D 11/0691 297/14 |
| 5,498,062 A | * | 3/1996 | Holdampf ............ B60N 2/3084 297/14 |
| 6,119,980 A | * | 9/2000 | Ferry ................... A47C 1/0352 244/122 R |
| 6,896,322 B1 | * | 5/2005 | Foy ........................ A47C 1/126 297/129 |
| 7,070,149 B2 | * | 7/2006 | McDonnell ...... B64D 11/00153 244/118.5 |
| 2003/0025371 A1 | * | 2/2003 | Veneruso ............. B60N 2/0252 297/322 |
| 2005/0248198 A1 | * | 11/2005 | Fowler ................ B60N 2/3009 297/378.1 |
| 2007/0262625 A1 | | 11/2007 | Dryburgh et al. |
| 2012/0038196 A1 | * | 2/2012 | Lawson ............. B64D 11/0641 297/354.13 |
| 2014/0225400 A1 | * | 8/2014 | Nagayasu .............. B60N 2/995 297/75 |
| 2014/0300145 A1 | | 10/2014 | Beroth et al. |
| 2014/0300162 A1 | | 10/2014 | Udriste et al. |
| 2014/0319275 A1 | * | 10/2014 | Najd ...................... B64D 11/02 244/118.6 |
| 2015/0284087 A1 | * | 10/2015 | Henshaw ............ B64D 11/064 297/318 |
| 2016/0280377 A1 | * | 9/2016 | Pinkal .................. B60N 2/3015 |
| 2016/0376007 A1 | * | 12/2016 | Meindlhumer .... B64D 11/0641 297/14 |
| 2018/0155033 A1 | * | 6/2018 | Pacheco ................ B60N 2/504 |
| 2018/0273185 A1 | * | 9/2018 | Gill ..................... B64D 11/0643 |
| 2018/0362165 A1 | * | 12/2018 | Texeraud ................. B60N 2/34 |
| 2020/0115058 A1 | * | 4/2020 | Hoover ................ B64D 11/064 |

FOREIGN PATENT DOCUMENTS

| | | |
|---|---|---|
| FR | 2804072 | 7/2001 |
| WO | 2005060598 | 7/2005 |
| WO | 2011097206 | 8/2011 |

OTHER PUBLICATIONS

International Patent Application No. PCT/EP2016/076779, Written Opinion of the International Searching Authority (including English translation), dated Dec. 22, 2016.

* cited by examiner

AIRCRAFT SEAT FOR CABIN CREW

CROSS-REFERENCE TO RELATED APPLICATIONS

This application is a national phase entry under 35 USC § 371 of International Patent Application No. PCT/EP2016/076779 ("the '779 application"), filed Nov. 7, 2016, and entitled AIRCRAFT SEAT FOR CABIN CREW, which claims priority to and benefits of European Patent Application No. 15193929.5 ("the '295 application"), filed on Nov. 10, 2015. The '779 application and the '295 applications are hereby incorporated in their entireties by this reference.

FIELD OF THE INVENTION

The present invention relates to a seat of a high-comfort type for cabin crew, which seat is intended to be installed in an aircraft cabin. The invention proposes a seat which is ergonomic, compact, and lightweight.

BACKGROUND

The high-comfort seats for cabin crew, also known under the acronym HCCAS (for "High Comfort Cabin Attendant Seat" in English), are designed to provide a greater level of comfort than that of the conventional folding seats for cabin crew, allowing positions in which the back rest and the seat portion can be inclined.

The known HCCAS seats include a leg rest equipped with arms which it is necessary to unfold in order to enable support on the floor of the airplane. This manipulation of the seat, which cannot be carried out by an occupant sitting on the seat, is relatively tiresome.

Furthermore, the seat portion has a fixed angle relative to the floor of the airplane. The leg rest of the seat also extends beyond the seat portion when the seat is folded back, which renders the assembly bulky and limits the stowage space below the seat.

SUMMARY OF THE INVENTION

The invention relates in particular to effectively remedying these drawbacks by proposing a seat for cabin crew, intended to be installed in an aircraft, characterised in that it comprises:
  a seat structure intended to be fixed to a fixed portion of the aircraft,
  a seat portion, and
  a seat slide provided with two arms positioned on either side of the seat portion,
  the seat portion being mounted slidably relative to the seat slide between a retracted position and an extended position,
  one of the elements among the seat portion and the seat slide comprising rollers capable of sliding along corresponding rails provided in the other one of the elements among the seat portion and the seat slide,
  the rails having a curved shape so that the seat portion forms, in the extended position, an angle of more than 10 degrees, preferably of around 14 degrees, relative to a floor of the aircraft.

The invention makes it possible to provide the occupant with high comfort whilst offering a compact seating configuration. Furthermore, the invention makes it possible for the seat to be adjusted smoothly from one position to another while the occupant is sitting on the seat.

According to one embodiment, said seat also comprises a back rest having a first end mounted rotatably relative to the seat portion and a second end mounted rotatably relative to a head rest of said seat, said head rest being mounted slidably relative to the seat structure in such a way as to accompany a movement of said back rest.

According to one embodiment, the seat slide is mounted rotatably relative to the seat structure in order to enable the seat to move from a stowed position to a seating position.

According to one embodiment, the seat portion is capable of adopting intermediate positions between the retracted position and the extended position.

According to one embodiment, a maneuvering means, such as a lever, can act to cause the movement from one position to another by unlocking at least one locking pin co-operating with a recess provided in the seat slide, said maneuvering means being connected to the locking pin via a connecting cable. The actuation of the lever can be carried out while the occupant is in a sitting position on the seat.

According to one embodiment, said seat has a leg rest coupled to a shaft mounted rotatably relative to the seat portion in order to be able to move from a stowed position in which the leg rest is situated under the seat portion into an unfolded position in which the leg rest is situated in the extension of the seat portion.

According to one embodiment, said leg rest has a synchronization bar consisting of a roller at each of its ends, each roller being capable of sliding along a rail provided in an internal face of a side wall of the seat portion. This device makes it possible to maintain a firm support in an extended position of equal rigidity on either side of the leg rest.

According to one embodiment, a first locking system has a locking latch capable of securing the synchronization bar in order to keep the leg rest in the unfolded position.

According to one embodiment, said seat has a second locking system capable of securing the leg rest in the stowed position.

According to one embodiment, the second locking system has a locking recess installed on the side of the front edge of the leg rest capable of co-operating with a locking catch installed on the side of the rear edge of the seat portion.

According to one embodiment, the first and the second locking systems can be actuated via a common maneuvering means, such as a lever.

According to one embodiment, a damping system can absorb a force exceeding a threshold limit applied to the leg rest.

According to one embodiment, the damping system has at least one resilient element, such as a gas spring, having a first end mounted rotatably relative to the synchronization bar and a second end mounted rotatably relative to the leg rest.

According to one embodiment, said seat has a foot rest slidably mounted relative to the leg rest, and a resilient means is interposed between the foot rest and the leg rest.

According to one embodiment, said seat has an automatic fold-back system in order to move said seat automatically from a comfort position to a seating position.

According to one embodiment, the automatic fold-back system has a resilient cable, of which one end is fixed to the seat structure and the other end is fixed to the seat portion, said cable passing over at least one steering pulley for the cable and being situated between the two ends of said cable.

According to one embodiment, said seat has an automatic fold-back system in order to move said seat automatically from a seating position to a stowed position.

According to one embodiment, the automatic fold-back system has a resilient cable, of which one end is fixed to the seat structure and the other end is fixed to the seat slide, said cable passing over at least one steering pulley for the cable and being situated between the two ends of said cable.

Of course, the different characteristics, variants, and/or embodiments of the present invention may be associated with one another according to various combinations in so far as they are not incompatible with or exclusive of one another.

BRIEF DESCRIPTION OF THE DRAWINGS

The present invention will be better understood and other characteristics and advantages of the invention will become more apparent by reading the following detailed description comprising embodiments given by way of illustration with reference to the appended drawings, given by way of non-limiting examples, which could serve for complete understanding of the present invention and the disclosure of the implementation thereof and, as appropriate, contribute to the definition thereof, on which.

DETAILED DESCRIPTION

It should be noted that on the drawings the structural and/or functional elements common to the different embodiments may have the same references. Thus, unless otherwise specified, such elements have identical structural, dimensional, and material properties.

Furthermore, in the following description the relative terms of the "high" and "low" type are understood with respect to a seat in the usage position in an aircraft cabin. Moreover, we consider that the rear part of the seat is situated at the side of the back rest, whilst the front part of the seat is situated on the side opposite the back rest. Furthermore, the internal faces of a given element are turned towards a median plane of symmetry of the seat, whilst the external faces are turned to the opposite side.

Figure 1A:
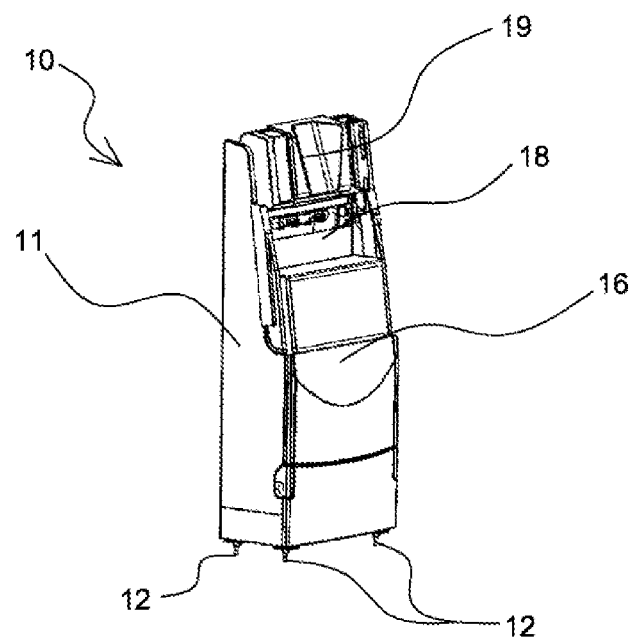
FIGS. 1a to 1c show different position of the seat for cabin crew according to the present invention.
Figure 1B:
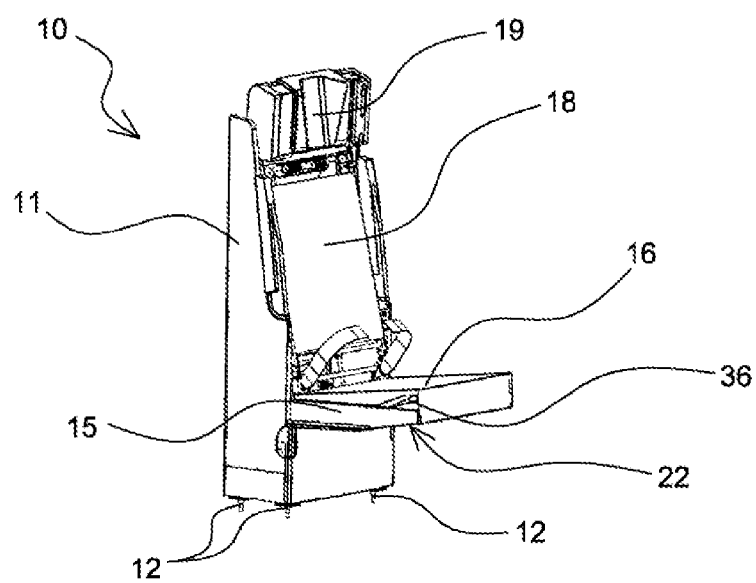
Figure 1C:
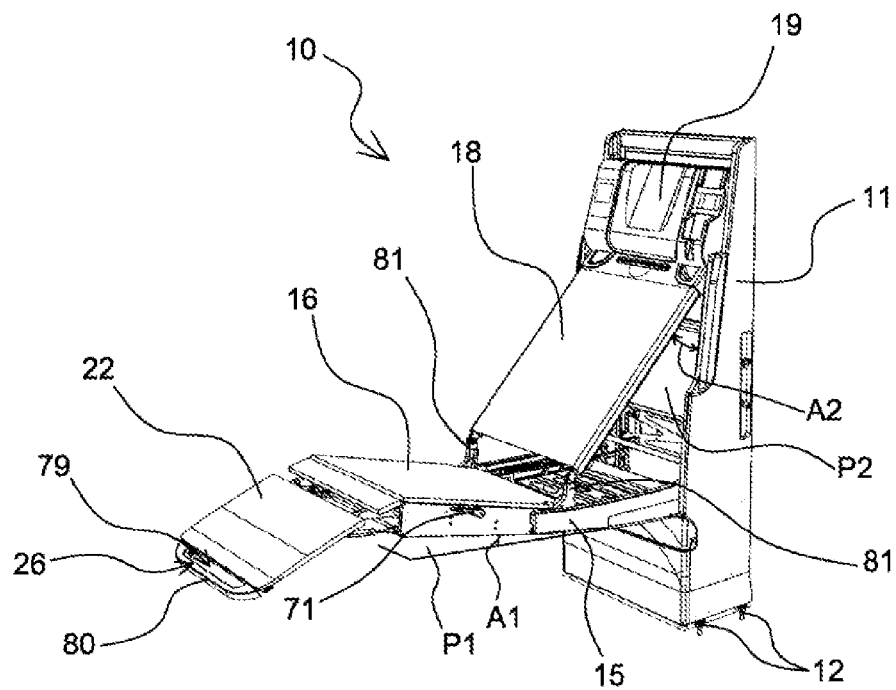

FIGS. 1a to 1c show a seat 10 for flight crew, comprising a seat structure 11 intended to be fixed to a fixed portion of an aircraft. To this end, the seat structure 11 may comprise, in the lower part, fastenings 12 intended to co-operate with rails of the aircraft. As a variant, the seat 10 could be fixed on a partition of the aircraft or a furniture item of the aircraft.

The seat 10 also has a seat slide 15 mounted rotatably with respect to the seat structure 11, a seat portion 16 mounted slidably with respect to the seat slide 15, a back rest which can be inclined 18, an adjustable head rest 19, an extendable leg rest 22 associated with a damping system 23, and a foot rest 26 installed in the leg rest 22.

The seat 10 is capable especially of adopting a stowed position shown on FIG. 1a in which the seat portion 16 is turned back against the seat structure 11, a seating position shown on FIG. 1b which is taken up during parking, takeoff, and landing of the airplane known as the TTOL position (acronym for "Taxi-Take Off-Landing" in English). The seat 10 can also adopt a comfort position shown on FIG. 1c in which the seat portion 16 is inclined by an angle A1 relative to a horizontal plane P1 parallel to the floor of the aircraft, and the back rest 18 is inclined by an angle A2 relative to a vertical plane P2. The floor of the aircraft extends in a plane perpendicular to a longitudinal direction of extension of the seat structure.

In one embodiment, the angle A1 is greater than 10 degrees, and is preferably about 14 degrees, whilst the angle A2 is approximately 45 degrees.

Figure 2:
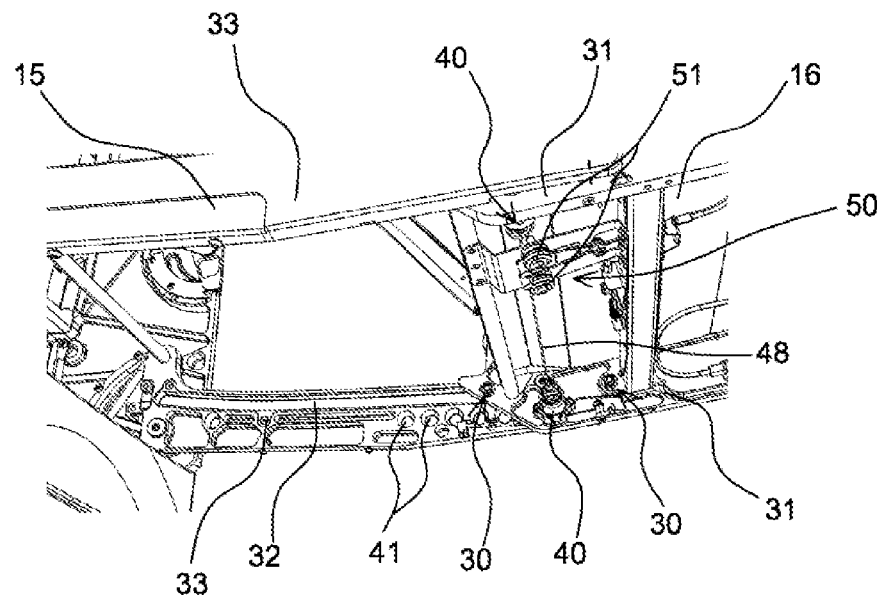
FIG. 2 is a view from below of the seat portion of the seat according to the invention in the extended position illustrating the system for locking and unlocking the seat portion in order to enable movement thereof from one position to the other.

More precisely, as can be seen on FIG. 2, the seat portion 16 is mounted slidably relative to the seat slide 15 between a retracted position corresponding to the seating position of the seat 10 and an extended position corresponding to the comfort position.

For this purpose, rollers 30, for example two rollers per side, are installed in the external face of each side wall 31 of the seat portion 16. These rollers 30 are capable of sliding along a corresponding rail 32 provided in the internal face of an arm 33 of the seat slide 15. The arms 33 are joined to one another and are positioned on either side of the seat portion 16. The rails 32 advantageously have an upwardly curved shape, that is to say in an opposite direction to the fastenings 12, in order to enable the seat portion 16 to form the angle A1 which is not equal to zero in relation to the floor when the seat portion 16 is in the extended position. During movement thereof towards the extended position, the seat portion 16 makes a rotational movement relative to the center of a circle corresponding to a radius of curvature of the rails 32.

Naturally, as a variant, the structure could be reversed, that is to say that the rollers 30 are installed in the seat slide 15, whilst the rails 32 are provided in the external faces of the side walls 31 of the seat portion 16.

A maneuvering means 36 such as a lever situated, for example, on the right of the seat portion 16 (cf. FIG. 7), can act to cause the movement of the seat portion 16 from one position to another by unlocking locking pins 40 situated on either side of the seat portion 16 and each co-operating with a corresponding recess 41 provided in the seat slide 15.

The drawings show end recesses 41 corresponding to the end positions of the seat 10 (seating position of FIG. 1a and comfort position of FIG. 1c), and recesses 41 situated between the end recesses in order to enable the seat 10 to adopt intermediate comfort positions. In these intermediate positions, the angles of inclination of the seat portion 16 and of the back rest 18 are smaller than the maximum angles of inclination. In one embodiment, six intermediate positions between the seating position and the comfort position are provided.

Figure 3:
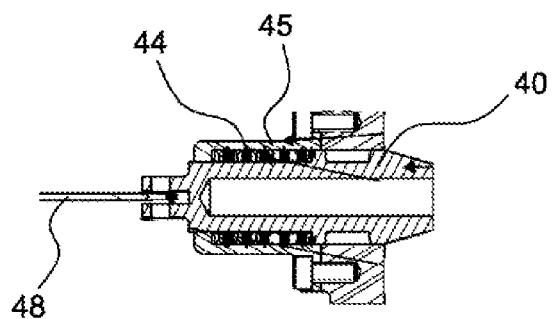
FIG. 3 shows a sectional view of a locking pin installed on the seat portion of the seat according to the invention.

For this purpose, as can be seen on FIG. 3, a resilient element 44, such as a spring, mounted inside a housing 45 loads the locking pin 40 in such a way that the pin 40 projecting relative to the side wall 31 of the seat portion 16 penetrates into a corresponding recess 41, which has the effect of securing the seat portion 16 in position. The activation of the lever 36 makes it possible to pull on a cable 48 connected to the pin 40 which then compresses the spring 44 in such a way that the pin 40 is disengaged from the recess 41 in order to move into an unlocked state and to enable the movement of the seat portion 16 towards another position.

A bevel gear system 50 comprises two pulleys 51 which enable orientation of the cable 48 connected to the lever 36 on each side of the seat 10 towards a corresponding locking pin 40.

Thus, the movement for extending the seat portion 16 can be easily controlled by activating the lever 36 and pushing the user's pelvis towards the front of the seat 10.

Figure 4A:
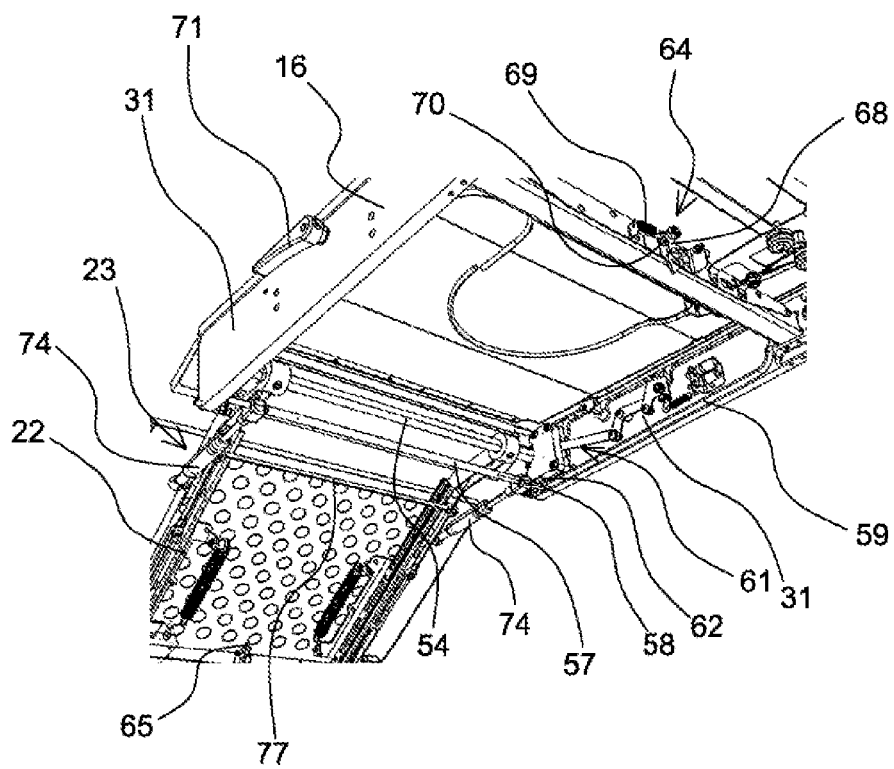
FIG. 4a shows a view from below of the front seat portion of the seat according to the invention, illustrating the locking systems which make it possible to keep the leg rest in the stowed position or in the unfolded position.
Figure 4B:
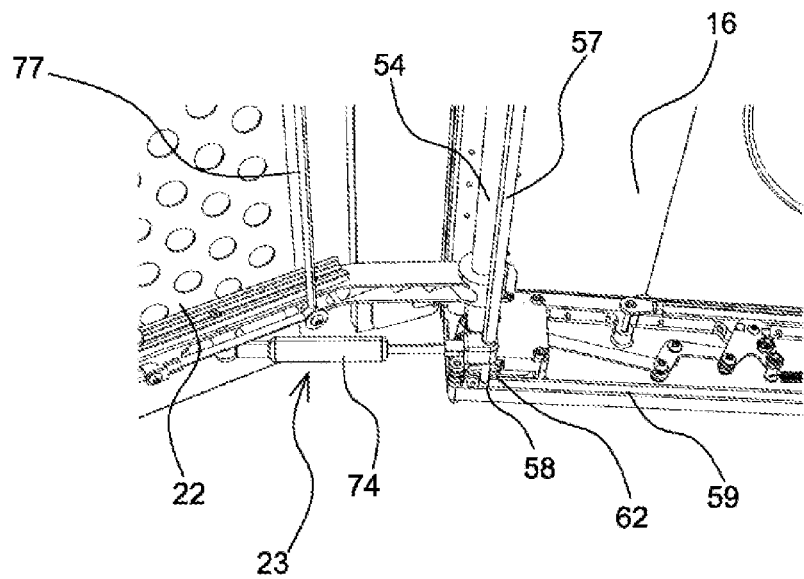
FIG. 4b shows a detailed view of the locking system which make it possible to keep the leg rest of the seat according to the invention in the unfolded position.
Figure 5:
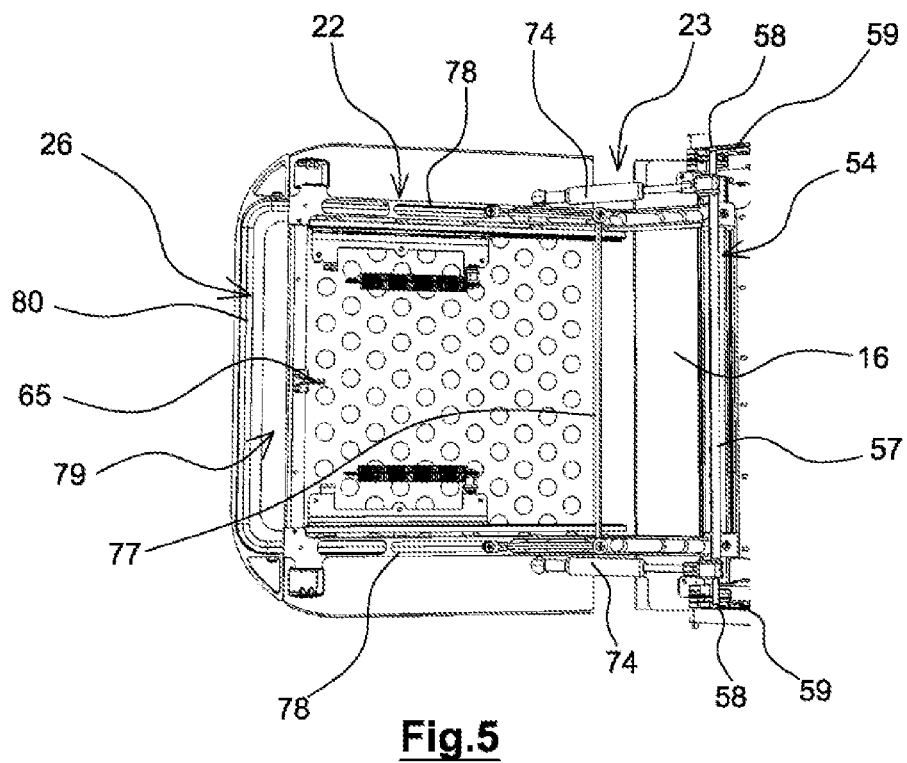
FIG. 5 shows a view from below of the leg rest of the seat according to the invention and of the associated foot rest in the retracted position.

Moreover, as can be seen on FIGS. 4a, 4b, and 5, the leg rest 22 is coupled to a shaft 54 mounted rotatably relative to the seat portion 16 in order to be able to move from a stowed position in which the leg rest 22 is situated under the seat portion 16 and in the plane of the seat portion, as shown in FIG. 1b, to an unfolded position in which the leg rest 22 is situated in the extension of the seat portion 16, and vice versa.

Furthermore, a transverse bar 57, known as a synchronization bar, mechanically connected to the leg rest 22 has a roller 58 at each of its ends. Each roller 58 is capable of sliding along a rail 59 provided in the internal face of a corresponding side wall 31 of the seat portion 16 when the leg rest 22 moves from one position to another.

Each rail 59 extends in a longitudinal direction of elongation of the corresponding side wall 31 and has an upwardly directed rear end portion.

A first locking system 61 has a locking latch 62 capable of securing the synchronization bar 57 in order to keep the leg rest 22 in the unfolded position.

A second locking system 64 is capable of securing the leg rest 22 in the stowed position. For this purpose, the second locking system 64 has a locking recess 65 installed on the side of the front edge of the leg rest 22 capable of co-operating with a locking catch 68 installed on the rear side of the seat portion 16, as shown in FIG. 4a. A spring 69 loads the catch 68 articulated at its center against an abutment 70, in such a way that the locking latch 68 then has a vertical orientation and penetrates into the recess 65 in order to keep the leg rest 22 in the stowed position.

During the activation of a maneuvering means 71, such as a second lever situated on the left side of the seat portion 16 (cf. FIG. 4a), a force transmitted via a cable is applied to the latch 68. This has the effect of inclining the catch 68 following the extension of the spring 69 in order to free the recess 65 and to unlock the leg rest 22.

This lever 71 may likewise act to cause the unlocking of the latch 62 of the locking system 61. For this purpose, the lever 71 is connected to the two locking systems 61, 64 by means of an appropriate cable system.

Moreover, the damping system 23 can absorb a force exceeding a threshold limit, for example of the order of 200N, applied to the leg rest 22. This threshold may nevertheless be adapted to other values as a function of the application.

For this purpose, the damping system 23 has at least one resilient element 74, such as a gas spring, having a first end mounted rotatably relative to the synchronization bar 57 and a second end mounted rotatably relative to the leg rest 22. In the illustrated embodiment a gas spring 74 is provided on each side of the seat portion 16. In the case of normal use of the seat 10, that is to say when there is no overloading of the seat portion 16, the gas springs 74 function as connecting rods for mechanical connection between the seat portion 16 and the leg rest 22.

On the other hand, in the case where the leg rest 22 is overloaded, for example when a person sits on the leg rest 22, the spring 74 retracts under the effect of the weight of the person and allows a rotation of the leg rest 22 on its shaft 54 whilst the synchronization bar 57 is locked with respect to translation. This makes it possible to protect the seat structure 11 mechanically by preventing the overloading from being transmitted to it.

The foot rest 26 is preferably mounted slidably relative to the leg rest 22. Furthermore, a resilient means 77 is interposed between the foot rest 26 and the leg rest 22. In the illustrated example, the foot rest 26 has a U shape, the two end arms of the foot rest 26 being mounted slidably inside lateral beams 78 of the foot rest 26.

The foot rest 26 can be activated by insertion of the heels in a recess 79 extending between the connecting bar 80 of the U and the leg rest 22, then by pushing with the heels on the bar 80 of the foot rest 26. The retraction of the foot rest 26 is automatic when the pressure exerted by the heels is released due to the presence of the resilient means 77.

For this purpose, the back rest 18 has a first end mounted rotatably relative to the seat portion 16 and a second end mounted rotatably relative to the head rest 19 of the seat 10.

For this purpose, a pivot connection is provided between projecting portions 81 situated on either side of the seat portion 16 and the lower end of the back rest 18, as shown in FIG. 1c.

Figure 6:
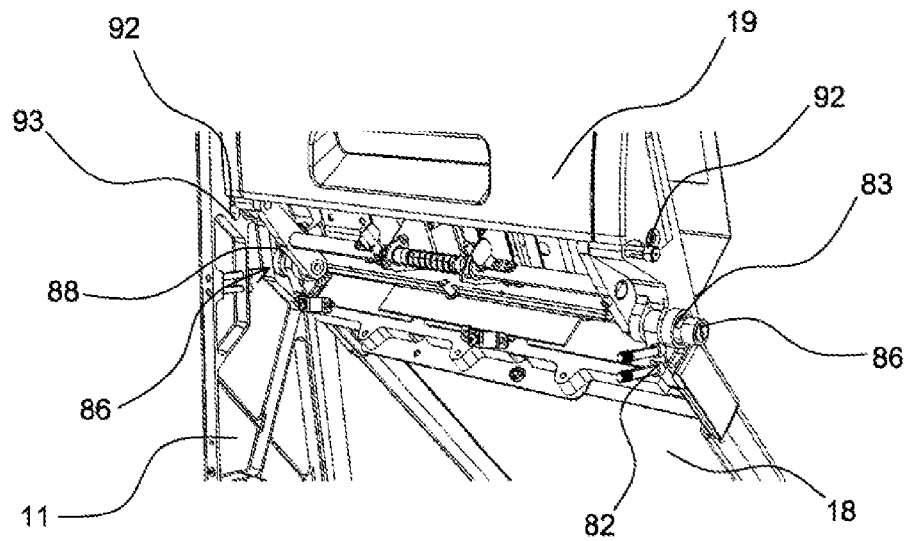
FIG. 6 shows a view of the upper part of the seat illustrating the connection between the back rest and the head rest of the seat according to the invention.

Moreover, as can be seen on FIG. 6, the upper end of the back rest 18 has on each side a connecting portion 82 mounted rotatably about a shaft 83 joined to the head rest 19. For this purpose, the connecting portion 82 has a through opening for the passage of the shaft 83. A roller 86 fixed on the side of the free end of the shaft 83 is intended to co-operate with a corresponding rail 88. A second roller 92 fixed on the head rest 19 is intended to co-operate with a corresponding rail 93.

The head rest 19 is mounted slidably relative to the seat structure 11. For this purpose, the thus equipped with four rollers (two rollers 86, 92 on each side) each co-operating with a corresponding rail 88, 93 provided in an upright of the seat structure 11.

The displacement of the rollers 86, 92 inside the rails 88, 93 makes it possible for the head rest 19 to accompany the movement of the back rest 18 when the seat 10 passes from one position to another.

The seat 10 is configured in such a way that, when the seat portion 16 is in the extended position, the back rest 18 is inclined relative to a vertical plane of the angle A2 of about 45 degrees.

Generally, because of the upward inclination of the seat portion 16, the seat 10 can return automatically by gravity to a seating position following unlocking of the pins 40. However, it will be possible also to provide an automatic fold-back system 96 of the seat 10 in order to move it from the comfort position to the seating position.

Figure 7:
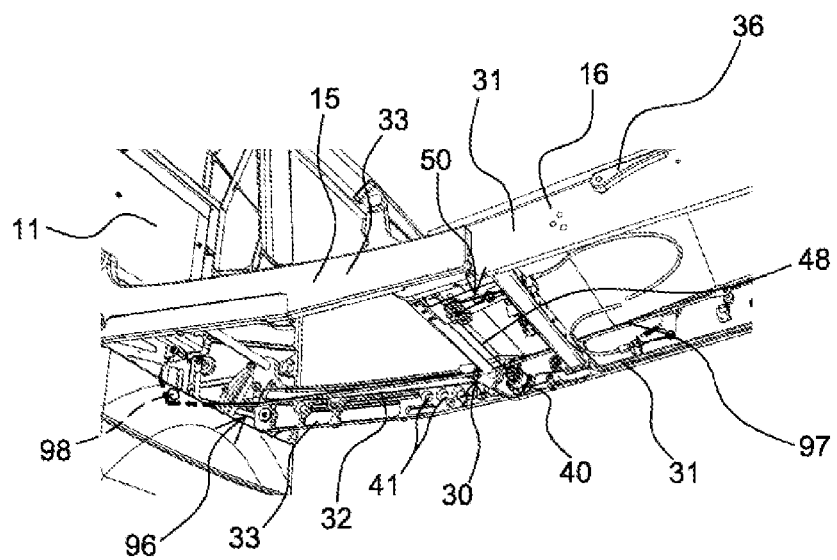
FIG. 7 shows a view from below of the seat portion of the seat according to the invention in the extended position illustrating the installation of a system for automatic folding of the seat portion towards the retracted position.

For this purpose, as can be seen on FIG. 7, the automatic fold-back system 96 has a resilient cable 97, of which one end is fixed to the seat structure 11 and the other end is fixed to the seat portion 16. The cable 97 passes over a pulley 98 for orientation of the cable 97, which pulley is situated between the two ends of the cable 97.

Figure 8:
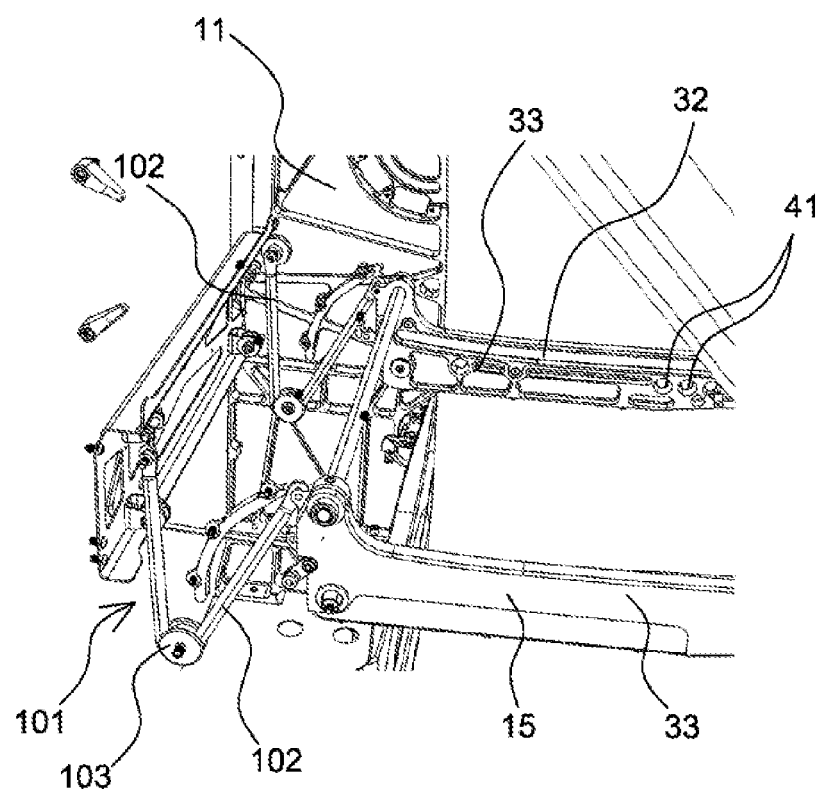
FIG. 8 shows a perspective view of the seat according to the invention in the extended position, illustrating the installation of a system for automatic folding of the seat towards the stowed position.

Furthermore, it will be possible to provide a second automatic fold-back system 101 of the seat 10 in order to move it from a seating position to a stowed position. For this purpose, as can be seen on FIG. 8, the automatic fold-back system 101 has a resilient cable 102, of which one end is fixed to the seat structure 11 and the other end is fixed to the seat slide 15. The cable 102 passes over at least one pulley 103 for orientation of the cable, which pulley is situated between the two ends of the cable 102. The system is configured in such a way that the cable 102 has a V shape.

A description is given below of a use of the seat 10 in order to move it from a stowed position to a comfort position.

During a first time period, the user causes the seat assembly 16 and the seat slide 15 to turn relative to the seat structure 11 in order to move the seat 10 from the stowed position to the seating position.

After the user has taken his place on the seat 10, the movement for extending the seat portion 16 in order to move it into the comfort position can be easily controlled by actuation of the lever 36 and by the user pushing the pelvis towards the front of the seat 10. In fact, the actuation of the lever 36 causes unlocking of the locking pins 40 which are disengaged from the corresponding recesses 41 provided in the seat slide 15. The seat portion 16 then slides towards the front along the rails 32 and the back rest 18 is inclined, accompanying the translational movement of the seat portion 16. The head rest 19 can follow the movement for inclination of the back rest 18 towards the rear by means of the assembly of rollers 86, 92/rails 88, 93 described above.

When the occupant is in the desired position (comfort position or intermediate position), release of the lever 36 results in locking of the pins 40 in the recesses corresponding to this position.

Moreover, if the occupant wishes to use the leg rest 22 stowed under the seat portion 16, he actuates the lever 71, which has the effect of releasing the catch 68 from the locking recess 65 and therefore causing the leg rest 22 to turn by gravity about its shaft 54 as far as an intermediate stable position in which the leg rest 22 forms an angle of about 90 degrees relative to the seat portion 16. The occupant can then grip the leg rest 22 in order to move it until it is in an unfolded position in which the latches 62 of the system 61 secure the ends of the synchronization bar 57 after this bar has slid along the rails 59 by means of the rollers 58.

It should be noted that all the manipulations of the seat 10 carried out by means of the levers 36, 71 in order to move the seat from a stowed position to a comfort position can be carried out while the occupant is sitting on the seat 10, which is not possible on the conventional seats for cabin crew.

In order to return the seat 10 from a comfort position to a stowed position, the occupant stows the leg rest 22 during a first time period. For this purpose, he actuates the lever 71, which has the effect of retracting the latches 62 of the system 61 and therefore of releasing the synchronization bar 57. Consequently, the leg rest 22 turns by gravity about its shaft 54 as far as the stable intermediate position. The occupant can then grip the leg rest 22 in order to move it until it is in the stowed position in which the catch 68 of the system 64 co-operates with the locking recess 65.

The occupant can then actuate the lever 36, which causes unlocking of the locking pins 40 which are disengaged from the corresponding recesses 41 provided in the seat slide 15.

Due to the presence of the resilient cable 97 of the system 96 which exerts a pulling force on the seat portion 16 towards the rear of the seat 10, the seat 10 returns automatically from the comfort position to the seating position.

When the occupant gets up, the seat 10 returns automatically from the seating position to the stowed position due to the presence of the resilient cable 102 of the system 101 which exerts a pulling force on the seat portion 16, thus forcing it to rotate towards the stowed position.

Quite obviously, the invention is not limited to the embodiments described above and given solely by way of example. It comprises various modifications, alternative forms, and other variants which the person skilled in the art may envisage within the scope of the present invention and in particular all combinations of the different modes of operation described previously, which may be taken separately or together.

The invention claimed is:

1. A seat for cabin crew, intended to be installed in an aircraft, the seat comprising:
    a seat structure configured to be fixed to a fixed portion of the aircraft;
    a seat portion;
    a seat slide provided with two arms positioned on opposing sides of the seat portion; and
    the seat portion being mounted slidably relative to the seat slide between a retracted position and an extended position;
    at least one of the seat portion or the seat slide comprises rollers capable of sliding along corresponding rails provided in the other one of the at least one of the seat portion or the seat slide;
    the rails having a curved shape so that the seat portion forms, in the extended position, an angle of more than 10 degrees relative to a floor of the aircraft,
    wherein the seat further comprises an automatic fold-back system to move the seat automatically from a comfort position to a seating position;
    wherein the automatic fold-back system has a resilient cable, wherein a first end of the resilient cable is fixed to the seat structure and a second end is fixed to the seat portion; and
    wherein the resilient cable passes over at least one pulley positioned between the first end and the second end of the resilient cable.

2. The seat of claim 1, further comprising a back rest having a first end mounted rotatably relative to the seat portion and a second end mounted rotatably relative to a head rest of said seat, said head rest being mounted slidably relative to the seat structure such that the head rest moves with of said back rest.

3. The seat of claim 1, wherein the seat slide is mounted rotatably relative to the seat structure in order to enable the seat to move from a stowed position to a seating position.

4. The seat of claim 1, wherein the seat portion comprises intermediate positions between the retracted position and the extended position.

5. The seat of claim 1, wherein a maneuvering means acts to cause the movement between the comfort position and the seating position by unlocking at least one locking pin co-operating with a recess provided in the seat slide, said maneuvering means being connected to the locking pin via a connecting cable.

6. The seat of claim 1, comprising a leg rest coupled to a shaft mounted rotatably relative to the seat portion and configured to move from a stowed position in which the leg rest is situated under the seat portion to an unfolded position in which the leg rest is situated in an extension of the seat portion.

7. The seat of claim 6, wherein the leg rest has a synchronization bar comprising a respective roller positioned at ends of the bar, wherein each roller is slidable along a rail provided in an internal face of a side wall of the seat portion.

8. The seat of claim 7, wherein a first locking system has a locking latch for securing the synchronization bar such that the leg rest is maintained in the unfolded position.

9. The seat of claim 8, comprising a second locking system for securing the leg rest in the stowed position.

10. The seat of claim 9, wherein the second locking system has a locking recess installed on a side of a front edge of the leg rest for co-operating with a locking catch disposed on a rear side of the seat portion.

11. The seat of claim 9, wherein the first and the second locking systems can be actuated via a common maneuvering means.

12. The seat of claim 7, wherein a damping system can absorb a force exceeding a threshold limit applied to the leg rest.

13. The seat of claim 12, wherein the damping system has at least one resilient element having a first end mounted rotatably relative to the synchronization bar and a second end mounted rotatably relative to the leg rest.

14. The seat of claim 6, comprising a foot rest slidably mounted relative to the leg rest and a resilient means that is interposed between the foot rest and the leg rest.

15. The seat of claim 1, comprising an automatic fold-back system to move said seat automatically from a comfort position to a seating position.

16. The seat of claim 15, wherein the automatic fold-back system has a resilient cable, wherein a first end of the resilient cable is fixed to the seat structure and a second end is fixed to the seat slide, and wherein the resilient cable passes over at least one pulley positioned between the first end and the second end of the resilient cable.

17. A seat for cabin crew, intended to be installed in an aircraft, the seat comprising:
- a seat structure configured to be fixed to a fixed portion of the aircraft;
- a seat portion;
- a seat slide provided with two arms positioned on opposing sides of the seat portion; and
- the seat portion being mounted slidably relative to the seat slide between a retracted position and an extended position;
- at least one of the seat portion or the seat slide comprises rollers capable of sliding along corresponding rails provided in the other one of the at least one of the seat portion or the seat slide;
- the rails having a curved shape so that the seat portion forms, in the extended position, an angle of more than 10 degrees relative to a floor of the aircraft;
- the seat further comprising an automatic fold-back system to move said seat automatically from a comfort position to a seating position,
- wherein the automatic fold-back system has a resilient cable, wherein a first end of the resilient cable is fixed to the seat structure and a second end is fixed to the seat slide, and
- wherein the resilient cable passes over at least one pulley positioned between the first end and the second end of the resilient cable.

18. A seat for cabin crew, intended to be installed in an aircraft, the seat comprising:
- a seat structure configured to be fixed to a fixed portion of the aircraft;
- a seat portion;
- a seat slide provided with two arms positioned on opposing sides of the seat portion; and
- the seat portion being mounted slidably relative to the seat slide between a retracted position and an extended position;
- at least one of the seat portion or the seat slide comprises rollers capable of sliding along corresponding rails provided in the other one of the at least one of the seat portion or the seat slide;
- the rails having a curved shape so that the seat portion forms, in the extended position, an angle of more than 10 degrees relative to a floor of the aircraft;
- comprising a leg rest coupled to a shaft mounted rotatably relative to the seat portion and configured to move from a stowed position in which the leg rest is situated under the seat portion to an unfolded position in which the leg rest is situated in an extension of the seat portion,
- wherein the leg rest has a synchronization bar comprising a respective roller positioned at ends of the bar, wherein each roller is slidable along a rail provided in an internal face of a side wall of the seat portion,
- wherein a first locking system has a locking latch for securing the synchronization bar such that the leg rest is maintained in the unfolded position,
- comprising a second locking system for securing the leg rest in the stowed position,
- wherein the second locking system has a locking recess installed on a side of a front edge of the leg rest for co-operating with a locking catch disposed on a rear side of the seat portion.

* * * * *